United States Patent [19]

Mukoyama et al.

[11] Patent Number: 4,505,818

[45] Date of Patent: Mar. 19, 1985

[54] LIQUID CHROMATOGRAPHIC COLUMN PACKING MATERIAL

[75] Inventors: Yoshiyuki Mukoyama; Osamu Hirai; Tetsuya Aoyama, all of Hitachi, Japan

[73] Assignee: Hitachi Chemical Co., Ltd., Tokyo, Japan

[21] Appl. No.: 534,077

[22] Filed: Sep. 20, 1983

[30] Foreign Application Priority Data

Sep. 24, 1982 [JP] Japan ................................ 57-167361

[51] Int. Cl.³ .............................................. B01D 15/08
[52] U.S. Cl. ............................ 210/502.1; 210/198.2; 210/635; 252/526; 252/528
[58] Field of Search ...................... 210/635, 656, 198.2, 210/198.3, 502.1; 521/52; 252/526, 528

[56] References Cited

U.S. PATENT DOCUMENTS 3,960,762  6/1976  Kroebel et al. ................. 210/656
4,272,246  6/1981  Fritz et al. ..................... 210/198.2
4,288,619  9/1981  Devos et al. ................... 210/198.2

Primary Examiner—John Adee
Attorney, Agent, or Firm—Antonelli, Terry & Wands

[57] ABSTRACT

A liquid chromatographic column packing material comprising porous styrene-divinylbenzene copolymer particles having $-SO_3^-$ groups and, as counterion thereof, ions represented by the formula: $^+NH_nX_m$ wherein X is $-CH_2OH$, $-(CH_2CH_2O-)_pH$ or $-CR'_q(CH_2OH)_r$ group; R' is hydrogen or a lower alkyl group; q and r are independently zero or an integer of 1 to 3, and q+r=3; p is an integer of 1 to 10; n is zero or an integer of 1; and m is an integer of 3 or 4, but m+n=4, is suited for separating sugars or sugaralcohols by liquid chromatography.

3 Claims, 8 Drawing Figures

LIQUID CHROMATOGRAPHIC COLUMN PACKING MATERIAL

This invention relates to a liquid chromatographic column packing material suited for separating sugars or sugaralcohols.

For separating sugars or sugaralcohols by liquid chromatography, a method is known in which particles of a sulfonated styrene-divinylbenzene copolymer known as a strongly acidic cation exchanger with sulfone groups thereof having been neutralized with proper inorganic cations such as $Na^+$, are used as column packing material. Use of such a packing material, however, tends to generate an adsorptive action between said packing material and a substance to be treated and it is often found impossible to fractionate the substance according to molecular size.

The present invention has solved such problems and provides a novel liquid chromatographic column packing material suited for separating sugars or sugaralcohols.

More specifically, this invention provides a liquid chromatographic column packing material comprising porous styrene-divinylbenzene copolymer particles having $-SO_3^-$ groups and, as counterion thereof, ions represented by the formula:

  (I)

wherein X is $-CH_2OH$, $-(CH_2CH_2O)_pH$ or $-CR'_q(CH_2OH)_r$ group; R' is hydrogen or a lower alkyl group; q is zero or an integer of 1 or 2 and r is an integer of 1 to 3, and $q+r=3$; p is an integer of 1 to 10; n is zero or an integer of 1; and m is an integer of 3 or 4, but $m+n=4$. The lower alkyl group in the definition of R' preferably has 1 to 3 carbon atoms. When q is 2, two or three R' may be the same or different.

In the accompanying drawings.

Figure 1:
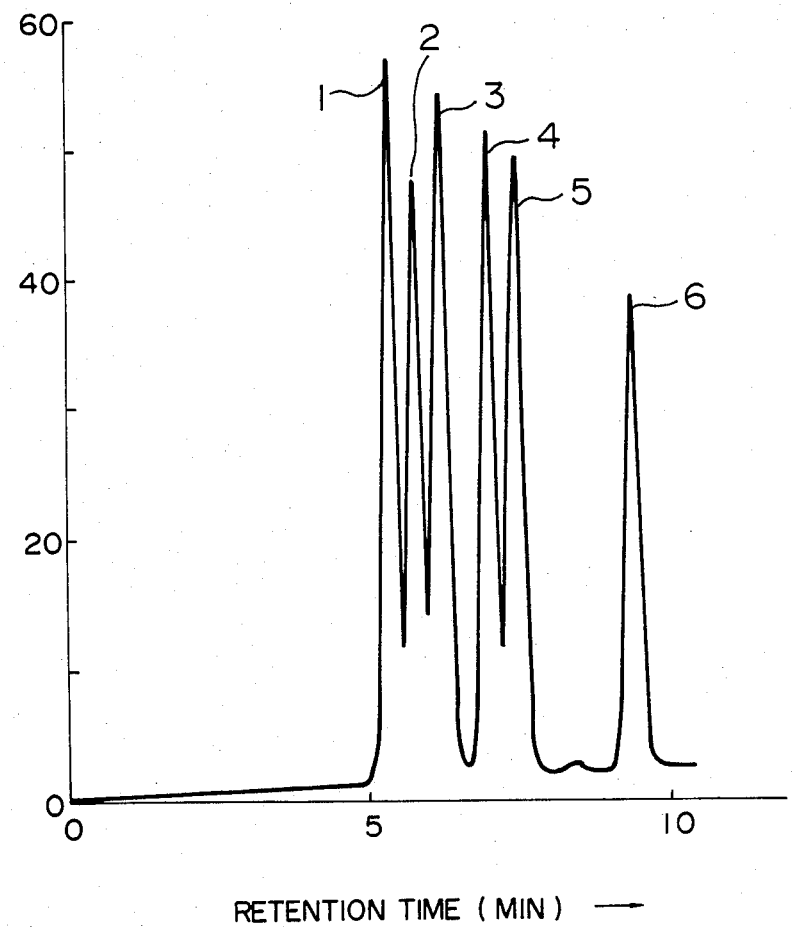
FIG. 1 and FIG. 2 are chromatograms showing the results of Example 1 and Example 2, respectively.
Figure 2:
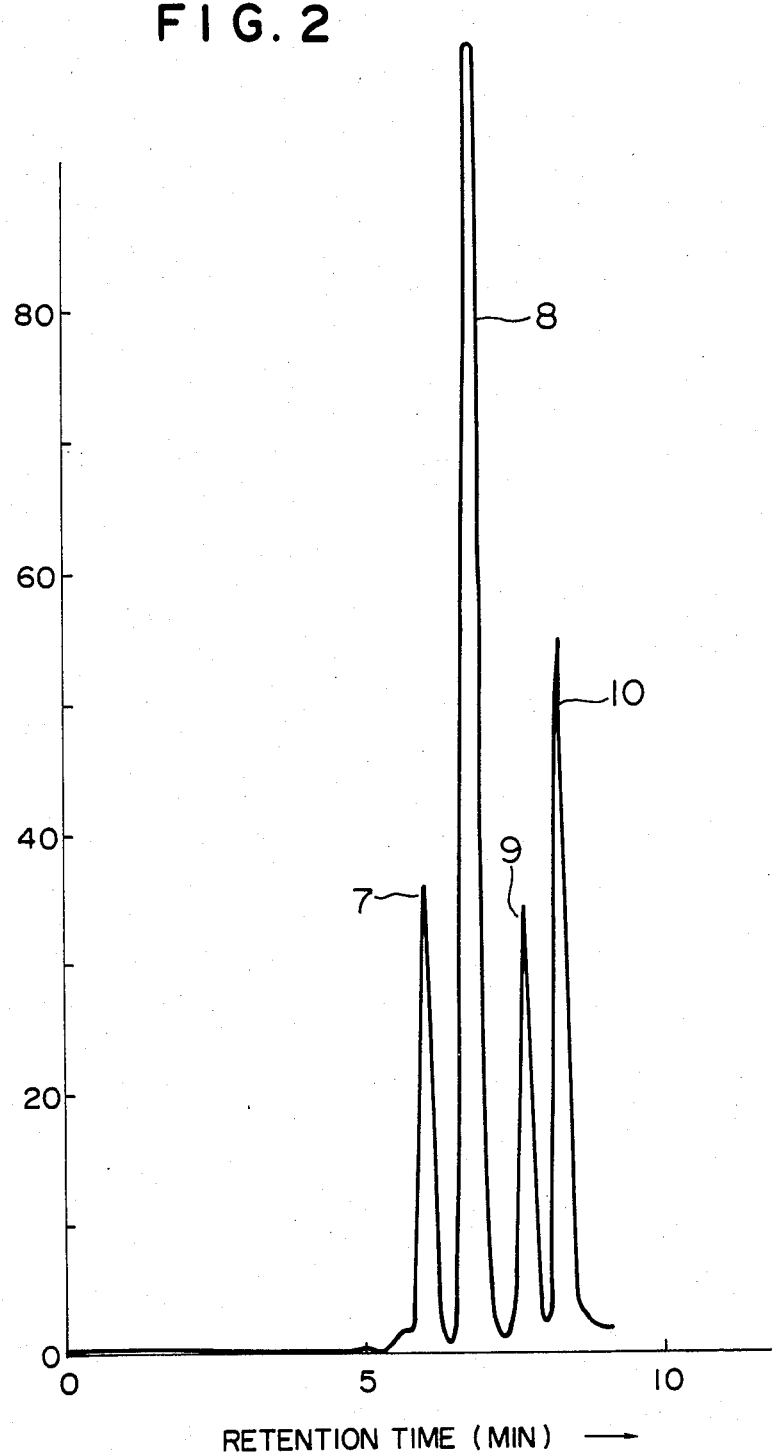
Figure 3:
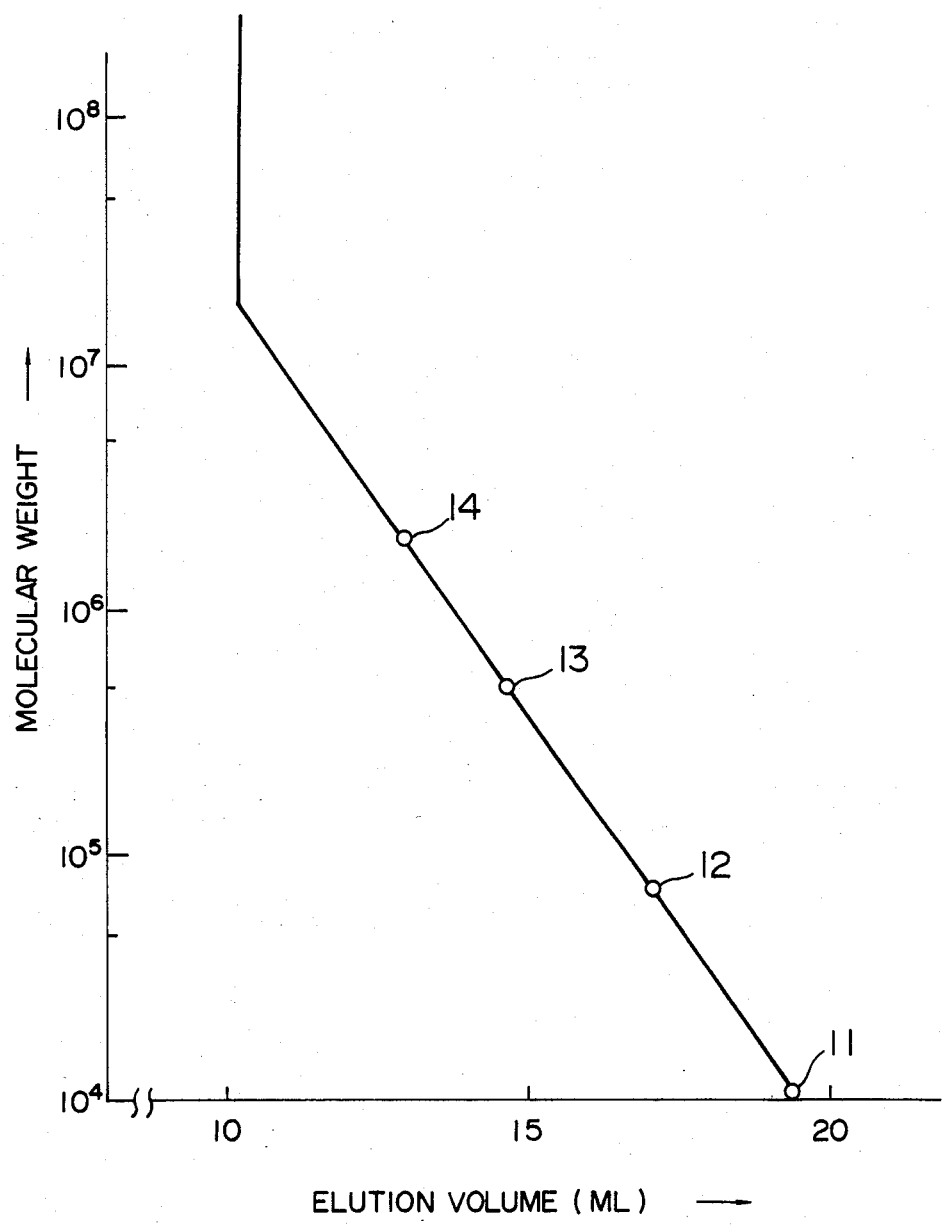
FIG. 3 is a molecular weight-elution volume curve showing the results of Example 3.
Figure 4:
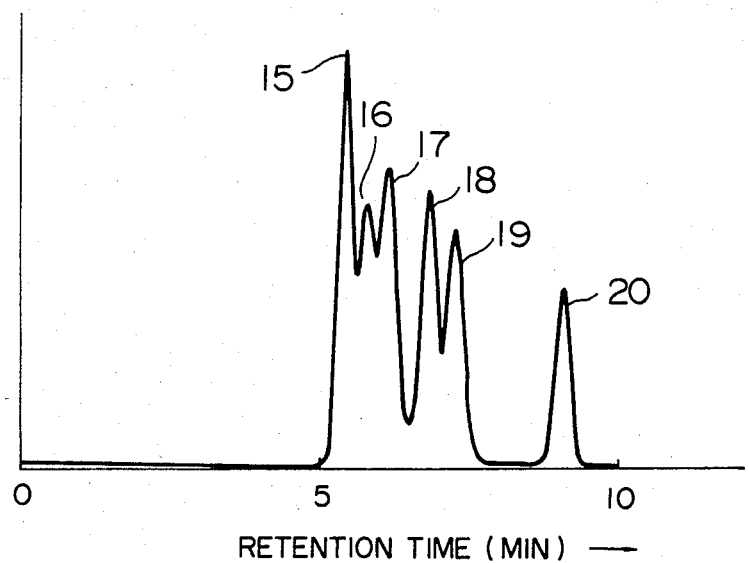
FIG. 4 is a chromatogram showing the results of Example 4.
Figure 6:
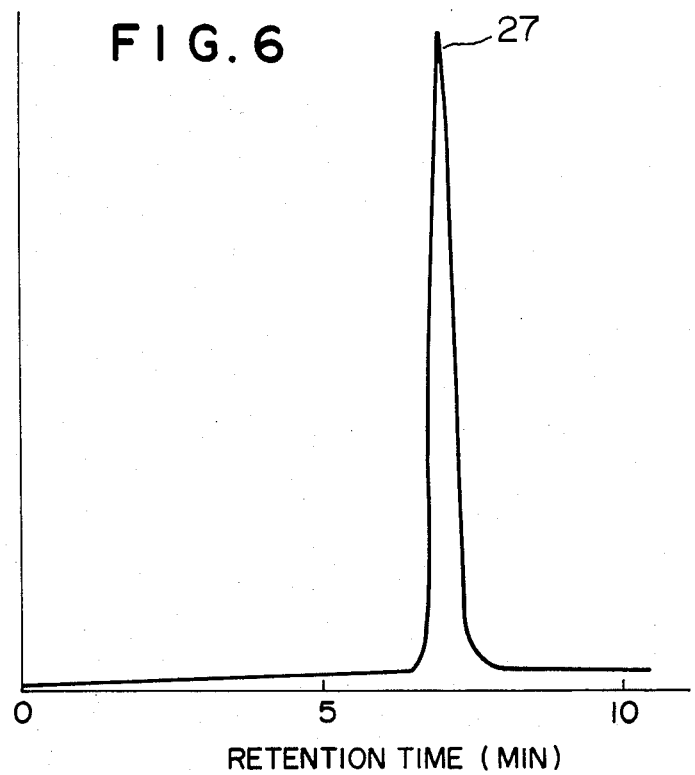
FIG. 6 is a chromatogram showing the results of Example 5.

The column packing material according to this invention preferably has $SO_3^-$ groups and the ions represented by the above-shown formula (I) as counterion thereof, each in an amount of 2 milliequivalents (2 meq/g), most preferably 3 to 5 meq/g, per gram of the packing material. If their amount is less than 2 meq/g, the packing material will not be provided with a sufficient hydrophilicity and may cause adsorption of the substance to be treated.

In order to eliminate the influence of adsorption that might occur, it is desirable that the packing material is substantially free of $-SO_3H$ groups or those $-SO_3H$ groups which have been neutralized with the inorganic cations. The term "substantially free" is used here to refer to a situation where the presence of $SO_3H$ groups or its neutralized version in the material cannot be confirmed in an analysis such as by neutralization titration.

The exclusive limit of said column packing material may be suitably decided, but it is usually desirable that such exclusive limit is in the range of 400 to $1 \times 10^7$. The particle size of the material is preferably in the range of 1 to 20 $\mu m$ for the liquid chromatographic analyses and in the range of 20 to 300 $\mu$ m for the fractionation by liquid chromatography.

The column packing material of this invention can be obtained by treating sulfonated porous styrene-divinylbenzene copolymer particles or their neutralized ones (as neutralized by for instance inorganic cations) with a compound represented by the following formula:

  (II)

wherein X, n and m are the same as defined in the formula (I), $Y^{k-}$ is an anion, and l, k and h are each a positive integer, l being equal to the product of k and h.

This treatment can be favorably accomplished by the following methods: (1) The sulfonated porous styrene-divinylbenzene copolymer particles or their neutralized ones are dispersed in an aqueous solution containing a compound of the formula (II) in an excess amount with respect to $-SO_3^-$ groups and the suspension is stirred to effect an ion exchange. (2) The sulfonated porous styrene-divinylbenzene copolymer particles or their neutralized version are packed in a column or placed on a funnel and an aqueous solution containing a compound of the formula (II) in an excess amount over $-SO_3^-$ group is passed through the column to perform ion exchange. Especially when using the sulfonated porous styrene-divinylbenzene copolymer particles, it is desirable to employ a method in which the material is neutralized with an aqueous solution containing a compound of the formula (II) wherein $Y^{k-}$ is $OH^-$ (and hence both of l and k in the formula (II) are 1).

In these methods, the amount of the compound of the formula (II) to be used and the concentration of its aqueous solution are not specifically defined provided that the amount of said compound is sufficient to attain the perfect exchange of the counterions of $SO_3^-$ groups in the packing material.

The cations represented by the formula (I) and the cationic moiety of the compound represented by the formula (II), that is, the cations represented by $(NR_nX_m)^+$ include tetraethanolammonium ion, triethanolammonium ion, N,N,N-triethanol-1,1,1-trimethylolmethylammonium ion, N,N-diethanol-1,1,1-trimethylolmethylammonium ion and the like. Use of such cations enables the effective separation of the substance according to the molecular size while causing little adsorption. In case of using primary or secondary ammonium as the cations, the accuracy of separation according to molecular size is lowered. The anionic moiety of the compound of the formula (II), that is, the anions represented by $Y^{k-}$ are not subject to any specific restrictions, but when the solubility of the compound of the formula (II) in water is considered, the hydroxide ion ($OH^-$) and chloride ion ($Cl^-$) are preferred.

The compounds of the formula (II) can be produced by, for instance, dissolving amines such as triethanolamine, diethanolamine, monoethanolamine, N,N-diethanol-1,1,1-trimethylolmethylamine, etc., in water or an inorganic acid solution such as hydrochloric acid solution, or by dissolving said amines and 2-chloroethanol in water. The inorganic salts such as hydrochloride can be isolated.

The sulfonated porous styrene-divinylbenzene copolymer particles can be produced by conventional process. For instance, they can be produced by suspension polymerizing divinylbenzene and a styrene monomer in the presence of a water-insoluble organic solvent such as amyl alcohol, toluene or the like, isolating the produced particles, swelling them with a swelling agent such as dichloroethane, trichloroethane or the like, and adding thereto concentrated sulfuric acid or chlorosulfuric acid to sulfonate the polymer at room temperature to 120° C. The ion exchange capacity can be adjusted by properly controlling the reaction conditions when the swollen polymer particles are reacted with concentrated sulfuric acid or chlorosulfuric acid. Also, the exclusive limit of the column packing material of this invention can be set as desired by adequately adjusting the suspension polymerization conditions, especially the type and the amount of the water-insoluble organic solvent used. The particles size can be regulated by properly selecting the suspension polymerization conditions.

In the above-said polymerization reaction, divinylbenzene is preferably used in an amount of 5 to 60% by weight based on the total amount (weight) of the reaction materials. As the styrene monomer to be polymerized with divinylbenzene, there may be used styrene, ethylmonovinylbenzene, vinyltoluene, α-methyl styrene and the like. It is also possible to use other monomer(s) such as vinyl acetate, methacrylic acid, acrylic acid and the like in an amount not greater than 5% by weight based on the total weight of the reaction materials. A polymerization initiator of the commonly used type, for example a peroxide such as benzoyl peroxide can be used for the suspension polymerization.

The column packing material of this invention is suited for separating sugars and sugaralcohols, and in the separating operation, water can be used as the specimen solvent and the eluent.

The sugars that can be separated by using the column packing material of this invention include raffinose, sucrose, glucose, arabinose, dextran and the like. The sugaralcohols also separable by use of the packing material of this invention include maltitol, mannitol, sorbitol, inositol and the like.

The column packing material of this invention can be applied to gel permeation chromatography in which the specimen supplied from a sample inlet is passed through the column packed with the packing material of this invention while simultaneously feeding an eluent and the passed substance is detected by a detector to draw up a chromatogram, fractionation generally called gel filtration in which the specimen is passed through the column packed with the packing material of this invention and the respective fractions are collected, and other types of analytical processes. Any known methods may be employed for filling the packing material of this invention in a column. The most preferred method of packing is to press the slurry-formed material into the column.

Preferable conditions at the time of analysis are column diameter 2.0 to 15 mm, column length 150 to 600 mm, and flow rate 0.1 to 2 ml/min., and preferable conditions at the time of dispensing are column diameter 10 to 50 mm, column length 300 to 600 mm, and flow rate 1 to 10 ml/min. Further, 2 to 4 columns can be used by connecting them in series.

As the detector, there can be used conventional ones such as a differential refractometer, a light-scattering type detector, etc.

In these separating processes, the column packing material of this invention does not act as an ion exchange resin.

The column packing material of this invention will be further described below by way of the synthesis examples as well as the working examples thereof.

SYNTHESIS EXAMPLE 1

30 g of sulfonated porous styrene-divinylbenzene copolymer particles (prepared by sulfonating porous divinylbenzene-ethylmonovinylbenzene-styrene three-component copolymer particles with a divinylbenzene content of 10% by weight; particle size: 8–15 μm, ion exchange capacity: 4.5 meq/g) were placed on a glass filter and treated with 2 liters of a 20% triethanolamine hydrochloride solution, followed by washing with 1 liter of water to obtain a column packing material. This material showed an exclusive limit of 900 and all of the sulfone groups have been neutralized into $-SO_3^-[NH(C_2H_4OH)_3]^+$.

SYNTHESIS EXAMPLE 2

A column packing material was produced in the same way as Synthesis Example 1 by using the sulfonated porous styrene-divinylbenzene copolymer particles (prepared by sulfonating the porous divinylbenzeneethylmonovinylbenzene-styrene three-component copolymer particles with a divinylbenzene content of 45% by weight; particle size: 8–15 μm, ion exchange capacity: 3.5 meq/g). The exclusive limit of this product was $2 \times 10^6$.

SYNTHESIS EXAMPLE 3

A column packing material was produced in the same way as Synthesis Example 1 except that a 20% N,N-triethanol-1,1,1-trimethylol-methylamine hydrochloride solution was used in place of the 20% triethanolamine hydrochloride solution. This product had an exclusive limit of 700.

SYNTHESIS EXAMPLE 4

A column packing material was produced in the same manner as Synthesis Example 1 except for use of a 5% sodium chloride solution in place of the 20% triethanolamine hydrochloride solution. The exclusive limit of this product was 1000.

SYNTHESIS EXAMPLE 5

A column packing material was produced by following the same process as in Synthesis Example 1 except that a 20% tris (hydroxymethyl)methylamine hydrochloride was used in place of the 20% triethanolamine hydrochloride solution. The product showed an exclusive limit of 700.

EXAMPLES 1–5 and COMPARATIVE EXAMPLES 1–2

Each of the column packing materials obtained in Synthesis Examples 1 to 5 was packed in a specified column and the column was properly set in a high-speed liquid chromatographic appratus and subjected to a liquid chromatographic analysis under the conditions shown in Table 1 by using the specimens also shown in Table 1. The results of the analyses in the respective cases are shown in FIGS. 1 to 7.

TABLE 1

| | Column packing material | Column (inner diam.)mmφ × (length)cm | Sample amount (μl) | Eluent | Flow rate (ml/min) | Column pressure (kgf/cm²) | Chart speed (mm/min) | Detector | Column temp. (°C) | Specimens (figures in the parentheses are molecular weight) | Test result | Denotation in the drawings |
|---|---|---|---|---|---|---|---|---|---|---|---|---|
| Example 1 | Synthesis Example 1 | 8 × 30 | 10 | Water | 1.0 | 5 | 10 | Differential refractometer | 60 | (1) A mixed aqueous solution of Dextran T-10 (1 × 10⁴) (342), glucose (180), arabinose (150) and methanol (32) | Chromatogram of FIG. 1 | 1 peak of Dextran T-10<br>2 peak of raffinose<br>3 peak of sucrose<br>4 peak of glucose<br>5 peak of arabinose<br>6 peak of methanol |
| Example 2 | Synthesis Example 1 | " | " | " | " | " | " | Differential refractometer | " | (1) A mixed aqueous solution of maltitol (344), mannitol (182), sorbitol (182) inositol (180), glycerol (92) and ethylene glycol (62) | Chromatogram of FIG. 2 | 7 peak of maltitol,<br>8 joint peak of mannitol sorbitol and inositol<br>9 peak of glycerol<br>10 peak of ethylene glycol |
| Example 3 | Synthesis Example 2 | 8 × 50 | " | " | " | 4 | " | Differential refractometer Chromato- | " | (1) An aqueous solution of Dextran T-10 (1 × 10⁴)<br>(2) An aqueous solution of Dextran T-40 (1 × 10⁴)<br>(3) An aqueous solution of Dextran T-700 (1 × 10⁵)<br>(4) An aqueous solution of Dextran T-2000 (2 × 10⁶) (These solutions were determined separately to draw up the calibration curves) | Molecular weight-elution volume curve of FIG. 3 | 11 plot showing the peak position of Dextran T-10<br>12 plot showing the peak position of Dextran T-40<br>13 plot showing the peak position of Dextran T-700<br>14 plot showing the peak position of Dextran T-2000 |
| Example 4 | Synthesis Example 3 | 8 × 30 | " | " | " | 8 | " | Differential refractometer | " | (1) The same mixed aqueous solution as used in Example 1 | Chromatogram of FIG. 4 | 15 peak of Dextran T-10<br>16 peak of raffinose<br>17 peak of sucrose<br>18 peak of glucose<br>19 peak of arabinose<br>20 peak of methanol |
| Comparative Example 1 | Synthesis Example 4 | " | " | " | " | 8 | " | Differential refractometer | " | (1) The same mixed aqueous solution as used in Example 2 | Chromatogram of FIG. 5 | 21 peak of maltitol<br>22 peak of mannitol<br>23 peak of sorbitol<br>24 peak of inositol<br>25 peak of glycerol<br>26 peak of ethylene glycol |
| Example 5 | Synthesis Example 1 | " | " | " | " | " | " | Differential refractometer | " | (1) A mixed aqueous solution of glucose (180) and fructose (180) | Chromatogram of FIG. 6 | 27 joint peak of glucose and fructose |
| Comparative Example 2 | Synthesis Example 5 | " | " | " | " | 9 | " | Differential refractometer | " | (1) The same mixed aqueous solution as used in Example 5 | Chromatogram of FIG. 7 | 28 peak of glucose<br>29 peak of fructose |

In the specimens, Dextran T-10, Dextran T-40, Dextran T-700 and Dextran T-2000 are commercial names of the products by Pharmacia Fine Chemicals AB.

Figure 5:
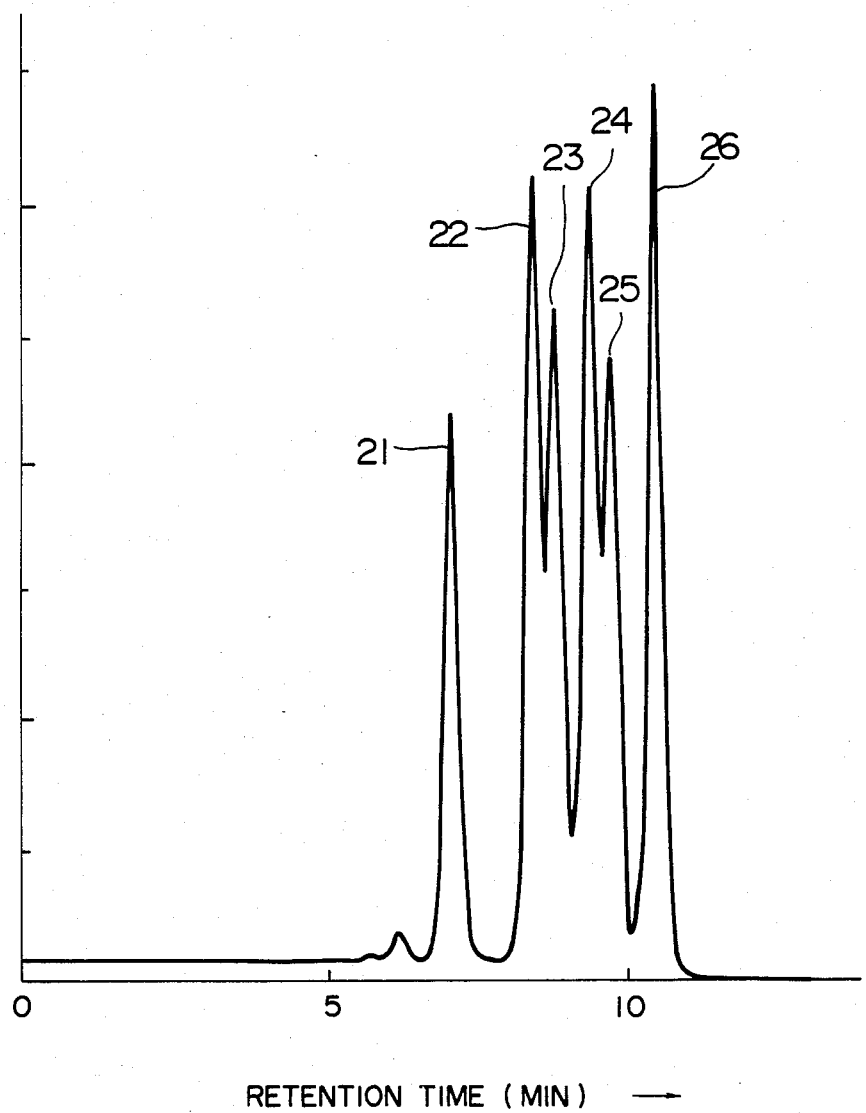
FIG. 5 is a chromatogram showing the results of Comparative Example 1.
Figure 7:
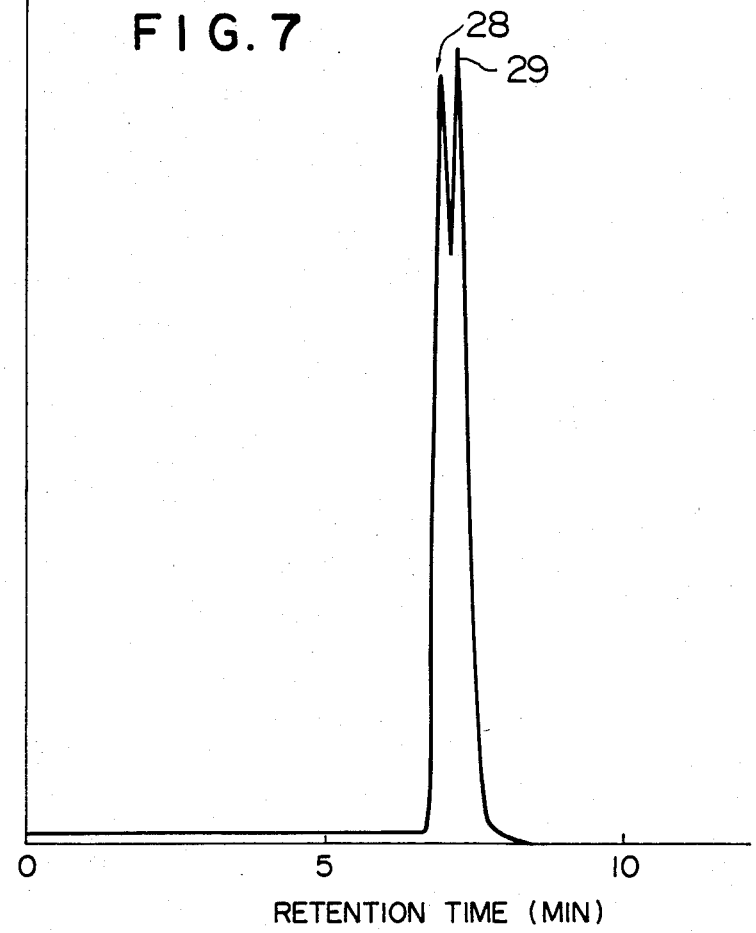
FIG. 7 is a chromatogram showing the results of Comparative Example 2.

In Comparative Example 1, as seen from FIG. 5, the sugaralcohols of the same molecular weight, that is, mannitol and sorbitol formed the separate peaks 21 and 22, respectively. Also, the peaks of the sugaralcohols which were the same or close to each other in molecular weight, that is, mannitol, sorbitol and inositol, were given as the separate peaks 21, 22 and 23, not forming a joint peak as in the case of Example 2 where said sugaralcohols were represented by a joint peak 8 as seen on the chromatogram of FIG. 2 obtained from the analysis conducted under the same conditions as Comparative Example 1. Thus, in Comparative Example 1, there could not be obtained a chromatogram showing the different peaks according to the difference of molecular weight.

Similar results were obtained in Comparative Example 2 in comparison with Example 5.

Figure 8:
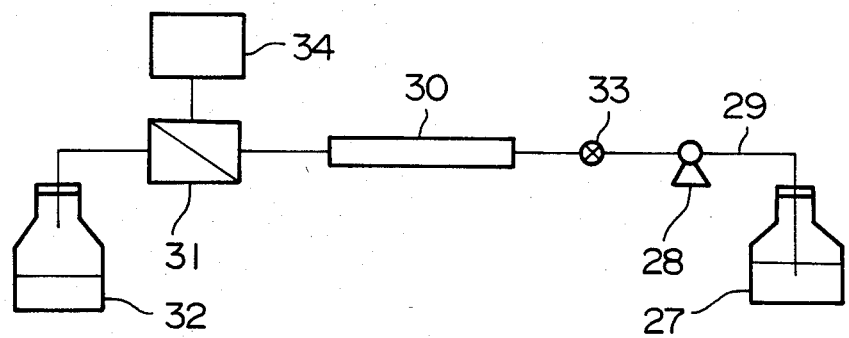
FIG. 8 is a schematic illustration of the analyzing system used in the respective Examples and Comparative Examples.

FIG. 8 is a schematic illustration of the analytic system used in Examples 1–5 and Comparative Examples 1 and 2. The eluent stored in a container 27 is pumped up through a pipe 29 by a pump 28 and passed through a column 30 and a detector 31, the used solution being collected in a container 32. The specimen is supplied into the system from an inlet 33 (for example a three-way cock). The detector 31 is connected to a chromatogram recoder 34.

As understood from the foregoing description, the column packing material according to this invention can be ideally used for separating sugars and sugaralcohols by liquid chromatography.

What is claimed is:

1. A liquid chromatographic column packing material comprising porous styrene-divinylbenzene copolymer particles having $-SO_3^-$ groups and, as counterion thereof, ions represented by the formula:

$$^+NH_nX_m \qquad (I)$$

wherein X is $-CH_2OH$, $+CH_2CH_2O\}_pH$ or $-CR'_q(CH_2OH)_r$ group; R' is hydrogen or a lower alkyl group; q is zero or an integer of 1 or 2, r is an integer of 1 to 3, and $q+r=3$; p is an integer of 1 to 10; n is zero or an integer of 1; and m is an integer of 3 or 4, but $m+n=4$.

2. The liquid chromatographic column packing material according to claim 1, wherein the ion represented by the formula (I) is $+NH-C_2H_4OH)_3$.

3. The liquid chromatographic column packing material according to claim 1, wherein the group represented by the formula (I) is

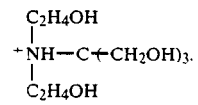

* * * * *